Patented Aug. 10, 1954

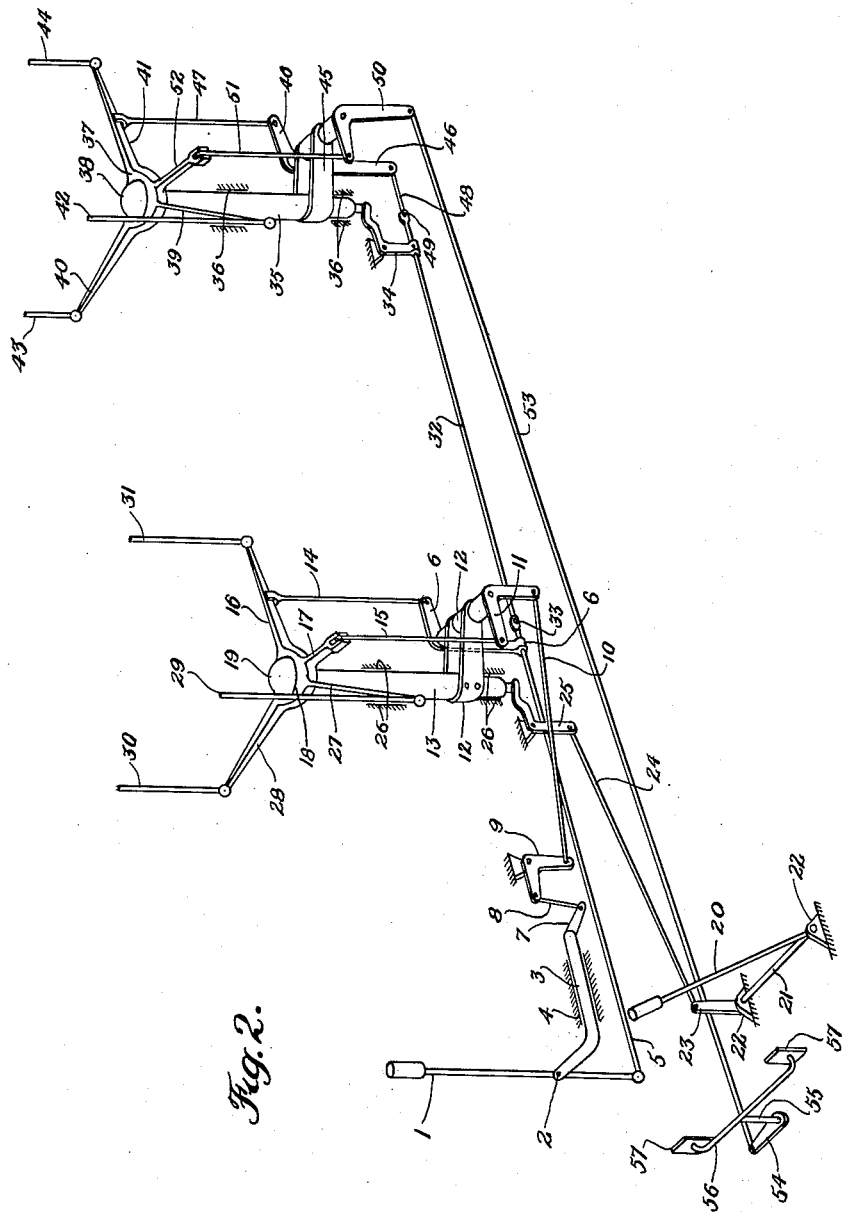

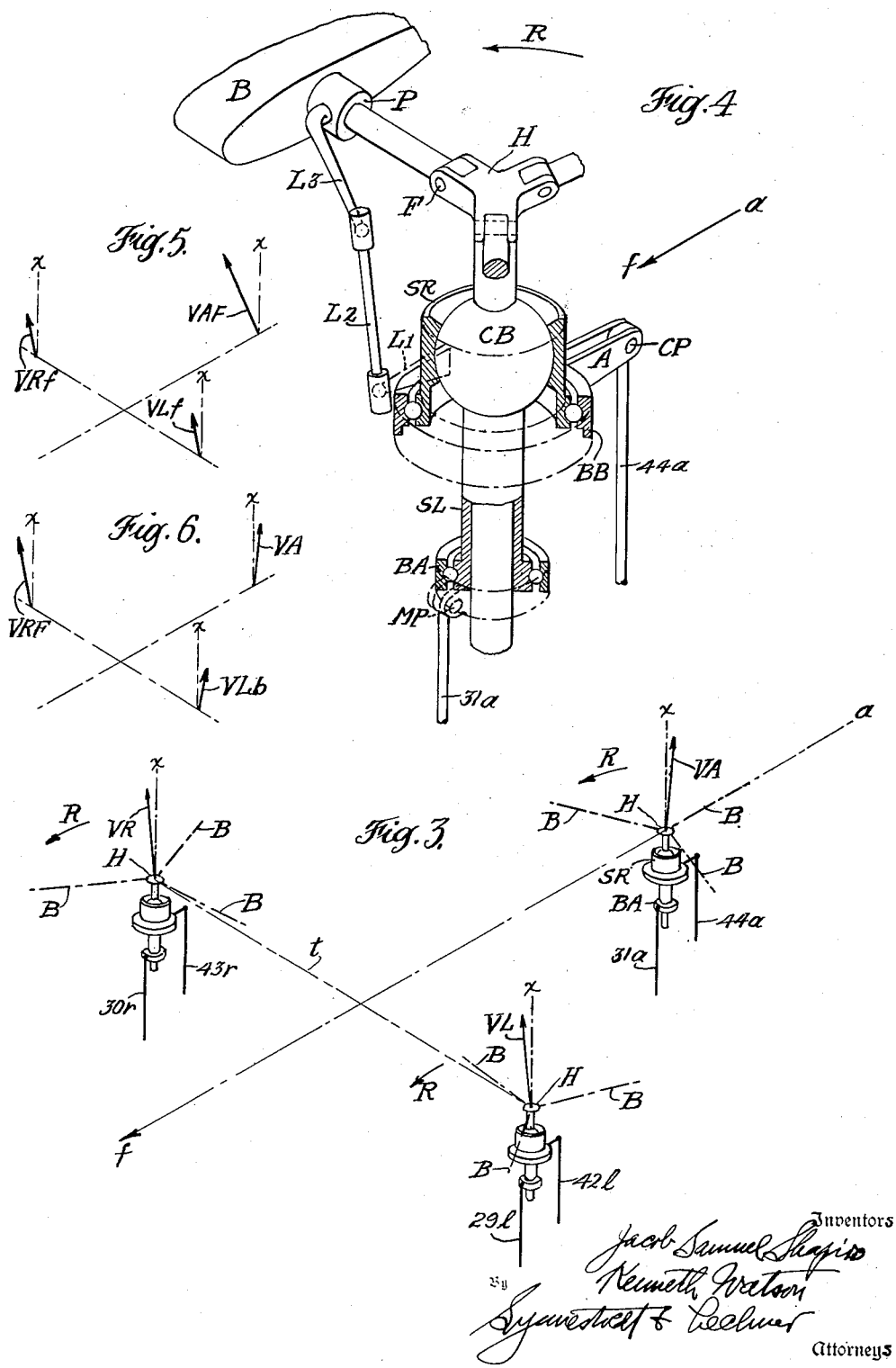

2,686,019

UNITED STATES PATENT OFFICE 2,686,019

CONTROL FOR ROTARY WING AIRCRAFT WITH MULTIPLE ROTORS

Jacob Samuel Shapiro, London, and Kenneth Watson, Woolston, Southampton, England, assignors to Autogiro Company of America, Philadelphia, Pa., a corporation of Delaware Continuation of application Serial No. 771,330, August 29, 1947. This application March 8, 1952, Serial No. 275,632

Claims priority, application Great Britain August 30, 1946

15 Claims. (Cl. 244—17.23)

This invention relates to controls for rotary wing aircraft with multiple rotors, and this application is a continuation of our application No. 771,330, filed August 29, 1947, now abandoned. More particularly, the invention is concerned with improvements in the control of helicopters, rotaplanes and the like aircraft with sustaining rotors having upright axes and flapping radial blades, the rotors being arranged in tandem. Before describing the nature of the invention certain terms used will be defined.

The term "flapping rotor" is by now well understood and the freedom for flapping may be secured in any of the known ways—for example, by means of a blade flapping pivot.

The term "tandem" as herein used includes any twin or multi-motor arrangement having the centre of at least one main rotor well aft of the C. G. of the aircraft and at least one main-rotor centre well forward of the C. G.

Control by varying the pitch-angles of all the blades of a rotor equally in the same sense, irrespective of their changes of position in azimuth during rotation of the rotor may be termed "mean pitch control."

Control by varying the amplitude and sign, whether or not varying the phasing with respect to a datum azimuth of the aircraft, of an oscillation of pitch-angle of the blades of a rotor having a frequency of once per revolution of the rotor, may be termed "cyclic pitch control."

When the phasing of the pitch-angle oscillation is such that the rotor thrust vector shifts essentially in the fore-and-aft sense, the control may be referred to as "fore-and-aft cyclic pitch control"; and such effect is produced (in a rotor whose blades may swing or yield in a flapping direction) if the phases of zero blade pitch-angle variation lie in the vertical fore-and-aft, i. e., pitching, plane of the aircraft.

When the phasing of the pitch-angle oscillation is such that the rotor thrust vector shifts essentially in the transverse sense, the control may be referred to as "transverse cyclic pitch control"; and such effect is produced (in a rotor of the above-described type) if the phases of zero blade pitch-angle variation lie in the vertical transverse, i. e., rolling, plane of the aircraft.

In the presently illustrated embodiment of the invention, the required cyclic pitch control actions are applied to the rotors only in the sense first mentioned, i. e., in the sense to shift the rotor thrust vector in the vertical fore-and-aft plane.

Simultaneous application of either mean pitch control or fore-and-aft cyclic pitch control to two or more rotors of a twin- or multi-rotor system may be called "collective" when mean or fore-and-aft cyclic blade pitch-angle changes (usually equal) are imparted to two or more rotors in the same sense, and may be called "differential," "opposite," or "inverse" when mean or fore-and-aft cyclic blade pitch-angle changes are imparted in one sense to one or more rotors and in the opposite sense to one or more other rotors.

When differential mean pitch control or differential fore-and-aft cyclic pitch control is applied to rotors disposed fore-and-aft of the C. G. of the aircraft, such control may be termed "longitudinally differential" mean pitch control or "longitudinally differential" fore-and-aft cyclic pitch control, as the case may be.

When differential mean pitch control or differential fore-and-aft cyclic pitch control is applied to rotors laterally separated, i. e. located at opposite sides of the longitudinal vertical plane containing the C. G. of the aircraft, such control may be termed "transverse differential" (or "lateral differential") mean pitch control or similarly designated fore-and-aft cyclic pitch control, as the case may be.

With a flapping rotor, the exercise of cyclic pitch control has the effect of inclining the lift vector in the vertical plane containing the zero pitch-angle-variation positions. Thus, fore-and-aft cyclic pitch control inclines the lift vector in the pitching plane of the aircraft, so that longitudinally differential fore-and-aft cyclic pitch control, as above defined, alters the "fore-and-aft dihedral angle," defined as the angle enclosed by the projections on the pitching plane of the lift vectors of rotors situated respectively in front of and behind the C. G. of the aircraft, and transversely differential fore-and-aft cyclic pitch control inclines the lift vectors of rotors, situated on opposite sides of the C. G., oppositely in planes parallel to the pitching plane, thus introducing equal and opposite fore-and-aft horizontal lift components on either side of the C. G., having equal moments in the same sense about the yawing axis.

The exercise of fore-and-aft differential mean pitch control in a tandem-rotor system gives rise to a pitching-couple on the aircraft, by applying opposite changes to the lifts of the rotors in front of and behind the C. G. respectively. The pitching couple rotates the whole aircraft in the pitching plane and introduces a forward or rearward component of the lifts of all the rotors. When the aircraft as a result of this has attained a forward or rearward speed at which the decrease of lift of the downstream rotor or rotors relatively to the lift of the upstream rotor or rotors, caused by the difference in rotor-disc-incidence due to the fore-and-aft dihedral angle and the effects of induced flow, gives rise to a pitching couple exactly compensating that introduced by the differential mean pitch control, the aircraft will stabilise in a new pitching attitude at a new forward speed.

The control action is therefore of a follow-up nature somewhat analogous to the control about the pitching axis of a single-flapping-rotor system by cyclic pitch control. With the latter, however, in forward flight, such follow-up action causes the plane containing the mean blade-tip path to approach or attain a position perpendicular to the (mechanical) axis of the rotor, in which position there is no "first-order" flapping, i. e. no component of flapping oscillation of frequency once per revolution of the rotor, whereas, in a tandem-rotor system in which fore-and-aft differential mean pitch control alone is used for controlling the aircraft about the pitching axis, flapping increases with forward speed and become excessive at high forward speeds, unless additional means are provided for suppressing or minimising flapping.

One essential feature of this invention is the provision, in a tandem rotor system with flapping rotors, of the combination of fore-and-aft differential mean pitch control with collective fore-and-aft cyclic pitch control, operated by a single controlling member. The control connections are to be such that there is a unique relationship between the average cyclic pitch angle amplitude of the several rotors and the fore-and-aft mean pitch difference, and that decrease of the mean pitch angles of the forward rotor(s) relatively to those of the rearward rotor(s) is accompanied by a progressive change of the average fore-and-aft cyclic pitch-angle amplitude of the several rotors in the sense to incline the mean lift vector forwardly, more particularly by arranging that the pitch-angles of the retreating blades of all the rotors are increased and those of the advancing blades are decreased.

In an arrangement in which all the rotors are of substantially equal disc-loading and solidity, and run at substantially the same speed, the mean pitch angles of the several rotors must be substantially equal in vertical or hovering flight, and the average cyclic pitch-angle amplitude of the several rotors must be zero (having regard to the algebraic sign of the several amplitudes). In such an arrangement, therefore, the neutral or zero position of the collective fore-and-aft cyclic pitch control will usually coincide with the neutral position of the fore-and-aft differential mean pitch control. In arrangements with unequal disc-loading, solidity or R. P. M. of the several rotors, the datum relationship between fore-and-aft differential mean and collective fore-and-aft cyclic pitch controls will have to be determined appropriately in each specific case. If desired, an independent "datum control" may be provided for varying the relationship of the neutral positions of the two controls.

Fore-and-aft differential fore-and-aft cyclic pitch control may also be provided. Its effect is to alter the fore-and-aft dihedral angle at the expense of introducing some first-order flapping. The dihedral angle is considered to be positive when the lift vectors are toed-out.

It may be independently controlled, but according to the preferred embodiment of the invention we incorporate the fore-and-aft differential fore-and-aft cyclic pitch control in the combined control system comprising fore-and-aft differential mean pitch and collective fore-and-aft cyclic pitch controls, all operated by one control member.

The fore-and-aft dihedral angle has an influence on the static stability in forward flight, and on the dynamic stability in hovering flight; and this influence is such that, usually, positive dihedral is called for in forward flight, and negative dihedral in hovering flight. The combined control connections are therefore to be such that the fore-and-aft dihedral angle progressively receives positive increments as forward speed increases, that is, displacement of the common control member to decrease the mean pitch angles of the forward rotor(s) relatively to those of the rearward rotor(s), and to change the average cyclic pitch amplitude in the way previously mentioned will also superimpose equal and opposite changes of cyclic pitch amplitude on the forward and rearward rotor(s) respectively, such changes of cyclic pitch amplitude being in the same sense in the rearward rotor(s) as the collective or average change of cyclic pitch amplitude of all the rotors, and in the forward rotor(s) in the opposite sense.

Thus, if a given control movement applies a change of fore-and-aft cyclic pitch amplitude $d$ to both forward and rear rotors it also applies changes $+d_1$ and $-d_1$ to the rear and forward rotors respectively, $d_1$ being proportional to $d$ so that the total changes $d_f$ and $d_r$ applied to the forward and rear rotors respectively are proportional, being respectively equal to $d-d_1$ and $d+d_1$.

If there are three or more rotors, of which one or more pairs are side-by-side, laterally differential (e. g. equal and opposite) fore-and-aft cyclic pitch control of side-by-side rotors may be provided. The effect of this is to introduce yawing moments; these must be independently controlled.

The invention also includes a preferred mechanism for carrying out the combined controls.

Such a mechanism includes a beam or spider rockable about a transverse (pitching) axis and having arms of equal length corresponding in position in azimuth to the lines joining the centres of the several rotors to the aircraft C. G., upwardly (or downwardly) extending links connecting the end of each arm of the beam or spider to the mean pitch control mechanism of the corresponding rotor and a control circuit connected to the control column or other operating member for rocking the beam or spider about the transverse (pitching) axis. The mechanism also includes a second similar beam or spider, similarly connected by links to the fore-and-aft cyclic pitch control mechanisms of the several rotors, and mounted to be bodily raised and lowered by a control circuit connected to the control column or operating member.

The second beam or spider may also be mounted for rocking about a transverse (pitching) axis on a member which can be raised or lowered bodily, the control circuit being so connected as to effect rocking of the beam or spider about the pitching axis as well as raising and lowering it bodily.

The rocking of the first mentioned beam or spider effects the fore-and-aft differential mean pitch control, the raising and lowering of the second beam or spider effects the collective foreand-aft cyclic pitch control, and the rocking of the second beam or spider effects the longitudinally differential fore-and-aft pitch control. The first mentioned beam or spider may likewise be mounted for bodily raising and lowering by an independent control circuit with its own control member, for effecting collective mean pitch control.

In a multi-rotor installation having a pair (or pairs) of rotors symmetrically disposed on either side of the rolling axis of the aircraft, the first mentioned spider may also be capable of rocking about a fore-and-aft (rolling) axis, and be connected by an independent control circuit to the control column, or an independent operating member, for rocking it about this axis. This effects transverse differential mean pitch control of the rotors for rolling the aircraft.

In such an installation the second-mentioned spider may also be mounted for rocking about a rolling axis and controlled in this movement by an independent control circuit connected to the yawing control member of the aircraft which thus effects control in yaw, by applying transverse differential fore-and-aft cyclic pitch control.

The nature of the invention will be better understood from the following description of a typical example of a control circuit mechanism for a three-rotor helicopter, with reference to the accompanying drawings, wherein:

Fig. 2 is a schematic perspective view, to a larger scale, of the controls and control linkages in the helicopter of Fig. 1;

Fig. 3 is a schematic view illustrating the machine in a condition of vertical flight, or of hovering, and showing the connection of the control linkages to the pitch control mechanisms at the rotor heads;

Fig. 4 is an enlarged, somewhat diagrammatic perspective view, partly broken away and partly in section, of the rotor head of one of the rotors, showing the root end of one of the rotor blades, together with its pitch control linkage;

Figure 1:
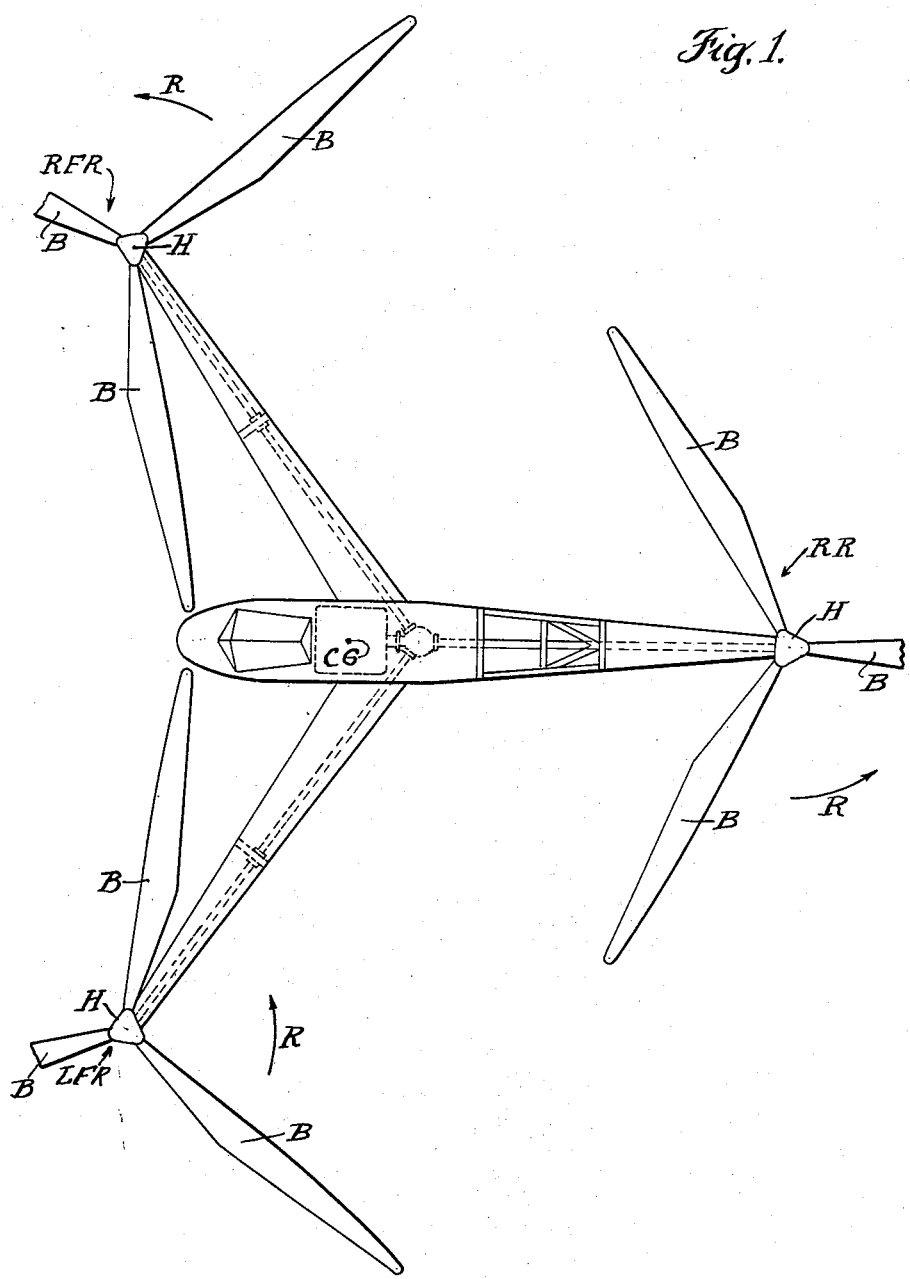
Fig. 1 is a fragmentary plan view of a three-rotor helicopter embodying the present invention.

Fig. 5 is a simplified vector diagram, illustrative of the several rotor thrust lines under a condition of forward flight; and Fig. 6 is a similar vector diagram for a flight condition in which the thrust lines of the two laterally disposed rotors have been oppositely tilted in fore-and-aft planes to produce a turning of the helicopter to the left, while at the same time the mean pitch (and thus the thrust) of the right rotor has been increased, and that of the left rotor decreased, to introduce a rolling effect toward the left.

The helicopter selected for exemplifying the invention has three identical rotors, which rotate in the same sense (as shown by arrows R) and whose centres (as indicated somewhat diagrammatically by the hubs H in Figs. 1, 3 and 4) are at the corners of an equilateral triangle in plan; the vertical fore-and-aft (pitching) plane of symmetry of the aircraft (designated by a line $f$—$a$) contains the centre of one of the rotors (in this embodiment the rear rotor RR) and bisects the transverse line $t$ joining the centres of the other two. The foregoing completely symmetrical arrangement inherently requires that the center of gravity (C. G. in Fig. 1) of the helicopter be at the center of said equilateral triangle, viewed in plan. In the example illustrated the normal forward direction of travel of the aircraft is with the two lateral rotors (RFR and LFR) in front and the single central rotor behind (rear rotor marked RR), but the reverse arrangement may be adopted with appropriate modification of the control circuits.

Each rotor is provided with mechanism, incorporated in the rotor hub and blade mountings, for mean pitch control and for fore-and-aft cyclic pitch control, each of the above controls having a separate external operating connection (shown, respectively, at MP and CP in Fig. 4). These mechanisms may be of any convenient type, e. g. a conventional swash-plate mechanism with independent connections for raising and lowering the swash-plate bodily for mean pitch control and for rocking the swash-plate about a transverse axis (parallel to the rolling axis of the aircraft) for fore-and-aft cyclic pitch control. A full description of a specific example of such mechanisms in a 3-rotor helicopter, with reference to illustrative drawings, is contained in the specification of patent application of C. G. Pullin, Serial No. 686,873, filed July 29, 1946 (which issued as Patent 2,651,480 on September 8, 1953), and in the corresponding issued British Patent 591,982, accepted September 3, 1947; but a simplified, more or less diagrammatic, showing thereof is illustrated in Fig. 3, and, to a larger scale (for one of the rotors), in Fig. 4.

A typical, well-known, conventional rotor hub, blade mounting, and swash-plate mechanism, with connections for mean and cyclic pitch control (as hereinbefore referred to) will be described with reference to Figure 4—for the rear rotor—and to some extent with reference to Figure 3—for illustration thereof in a three-rotor machine.

In Figure 4 the rotor blade B is mounted on the hub H, through the intermediation of the blade pitch change mounting P and the flapping pivot F. The swash-plate mechanism may take the form of a swash ring SR, coupled to the blade by the flexibly-jointed linkage $L_1$, $L_2$, $L_3$; said ring being tiltable in the fore-and-aft direction upon the central ball CB, through the intermediation of a ball bearing assembly BB having an arm A coupled at CP for the cyclic pitch connection $44a$. The central ball CB is slidable up and down on the hub structure (for mean pitch control) by means of a sleeve SL and bearing assembly BA to which is coupled at MP the mean pitch control connection $31a$.

These pitch control mechanisms and external operating connections of the several rotors are identical, so that equal displacements of the external operating connections in the same sense effect identical changes of mean blade pitch-angle, or fore-and-aft cyclic pitch amplitude and sign, in the three rotors respectively.

Referring to Fig. 2 which illustrates the control circuit mechanisms for displacing the said external operating connections of the rotor hub and blade mounting pitch control mechanisms, it will be seen that a control column 1 is pivoted at 2 for fore-and-aft movement on a rocking shaft 3 supported in bearings 4. Fore-and-aft movement of the control column is transmitted by means of a push-pull rod 5 to the vertical arm of a bell-crank 6; and lateral movement of the control column is transmitted by the rocking shaft 3 and a lateral crank 7 fixed thereto, through a link 8, a bell-crank 9, and a push-pull rod 10, to the vertical arm of a bell-crank 11. The bell-cranks 6, 11 are pivoted on a bracket 12 secured to a vertical pillar 13, and their horizontal arms are respectively connected by vertical links 14 and 15 with arms 16 and 17 of a horizontal spider 18, the arm 16 being fore-and-aft and rearwardly directed and the arm 17 being at right angles to arm 16 and directed to port. The spider is mounted concentrically on pillar 13 by means of a universal joint 19 (here shown as a ball joint) which will be provided with means (not shown) preventing rotation of the spider, e. g. a pin and slot connection; and it will be seen that the linkage described transmits fore-and-aft and lateral rocking of the control column to the spider, so that the latter repeats the displacements of the control column.

A "pitch-change" lever 20 is mounted on a transverse rocking shaft 21 supported in bearings 22 and carrying a crank 23 which is connected by a push-pull rod 24 to the vertical arm of a bell-crank 25, whose horizontal arm is connected to the pillar 13, which slides vertically in guides 26. Operation of the pitch-change lever thus raises and lowers the spider 18 bodily.

The spider 18 has two other horizontal arms 27 and 28 disposed at angles of 120° with arm 16 and with one another. The arms 27, 28, 16 are connected at equal radii from the centre of the spider with vertical links 29, 30, 31, whose other ends are connected (through further linkages, if needed) to the external operating connections (29l, 30r, and 31a) of the mean pitch control mechanisms of the left and right forward and central aft rotors, respectively. It will be seen that raising or lowering of the spider 18 in response to operation of the pitch change lever 20 applies equal displacements in the same sense to all three links 29, 30, 31, to vary the mean pitch angles of all the rotors equally in the same sense; and that rocking of the spider on its universal joint in response to movements of the control column applies differential displacements to the links 29, 30, 31. Fore-and-aft movement applies equal displacement in the same sense to the links 29 and 30 to increase (or decrease) equally the mean pitch angles of the two forward rotors, and a contrary displacement to the link 31, to vary the mean pitch angle of the central rear rotor in the opposite sense; and transverse movement applies equal and opposite displacements to links 29 and 30, to apply equal and opposite variations to the mean pitch angles of the port and starboard forward rotors respectively, and no displacement to link 31.

The cyclic pitch control circuits comprise an assemblage of spider, pillar, links and bell-cranks similar to that described for mean pitch control. The fore-and-aft cyclic pitch control circuit is operated by an extension rod 32 hinged to rod 5 at 33 and connected to the vertical arm of a bell-crank 34 whose horizontal arm is connected to a pillar 35 for raising and lowering it axially in guides 36. The pillar 35 carries a horizontal spider 37 on a universal joint 38, and the spider has three arms 39, 40, 41 corresponding in direction to the three arms 27, 28, 16 respectively of spider 18. Vertical links 42, 43, 44 are connected at equal radii of the spider to arms 39, 40, 41 respectively and are connected to the external operating connections 42l, 43r, and 44a, of the fore-and-aft cyclic pitch control mechanisms of the left and right forward rotors and the central aft rotor, respectively.

It will be seen that, in the present embodiment, forward displacement of the control column has several effects. First, it decreases the mean pitch of the forward rotors and increases that of the rear rotor by means of the first described spider mechanism. Secondly, it raises the pillar 35 and spider 37 of the second spider mechanism, by means of the rod 32 and crank 34. The effect of the latter is to apply collective fore-and-aft cyclic pitch control to the three rotors in the sense to increase the blade pitch-angles of the retreating blades of all three rotors and decrease those of the advancing blades. From the previous description of Figs. 3 and 4, it will be obvious that the first of these two effects is transmitted (through direct or indirect connections) from the respective rod elements 29, 30 and 31 (Fig. 2) to the ultimate external rod elements 29l, 30r and 31a of the mean pitch control mechanism of the respective left, right, and aft rotors. Similarly, the second of the said two effects is transmitted from rod elements 42, 43 and 44, respectively (directly or indirectly), to rod elements 42l, 43r and 44a of the cyclic pitch control mechanism of the left, right and aft rotors, respectively.

Further, the pillar 35 carries a bracket 45 on which a bell-crank 46 is pivoted. The horizontal arm of crank 46 is connected by means of a vertical link 47 with the rearwardly directed arm 41 of spider 37, and the vertical arm of the crank 46 is connected to a further extension rod 48 hinged to rod 32 at 49.

Thus, in the preferred embodiment, forward displacement of the control column has a third effect, as follows: It rocks the spider 37 in the pitching plane of the aircraft in the same sense as spider 18. This displacement applies longitudinally differential fore-and-aft cyclic pitch control to the rotors in the sense to increase the blade pitch-angle of the retreating blades and increase that of the advancing blades of the rear rotor, and to decrease the blade pitch-angles of the retreating blades and increase those of the advancing blades of the port and starboard forward rotors, thus increasing the fore-and-aft dihedral angle. This effect is of course transmitted to the three rotors through the same linkages (42, 43, 44) and (42l, 43r, 44a) previously referred to—the effects being superimposed, insofar as concerns their ultimate action upon the rotor blades.

The result of the said three effects, in terms of position and magnitude of rotor thrust lines, is readily illustrated by comparing the diagrammatic view of Fig. 3 and the rotor vector diagram of Fig. 5, as follows:

In these two figures the chain-dotted lines $x$ indicate the physical axes of the several rotors. Fig. 3 is typical of a hovering condition or of vertical flight of the helicopter. In that figure, the left, right, and aft rotor vectors (VL, VR and VA) are of equal magnitude; but they do not necessarily coincide with the respective rotor axes $x$—for the fore-and-aft vectors, as hereinbefore stated, may be toed-in, slightly, to give some negative fore-and-aft dihedral effect to the rotors (which has been found in some cases to improve the stability in hovering flight). For this purpose, neutral setting of the controls and linkages may be such that the left rotor thrust vector VL and that of the right rotor, VR, are inclined very slightly forwardly, while that of the aft rotor VA is inclined somewhat rearwardly; all as shown in Fig. 3, which, for clarity of illustration, shows these slight inclinations as being similar, although it will be understood that the angle of tilt of the vector VA, under the hovering condition, would normally be a little larger than the angle of tilt of the two forward rotors.

Now, when the stick 1 is moved forwardly, to secure the three effects hereinabove described, the combined result (as shown in Fig. 5) is to increase somewhat the angle of forward tilt, while decreasing the magnitude, of the lift thrust of the two forward rotors, as shown by the vector arrows VL$f$ and VR$f$; while at the same time the magnitude of the lift thrust of the aft rotor is increased, and it is given a greater forward angle of inclination than that of the forward rotors, as is shown by the vector VAF. In this way, we obtain the combined results of securing a positive dihedral of the mean tip-path planes of the fore-and-aft rotors (serving to increase the stability in forward flight) and also a sufficient increase in magnitude of the thrust vector of the aft rotor to approximately compensate for the reduced direct vertical lift (resulting from the inclination) and the reduced vertical lift effect caused by the working of the aft rotor in the disturbed air from the forward rotors as the machine advances forwardly.

Transverse differential fore-and-aft cyclic pitch control, i. e. imparting equal and opposite changes of fore-and-aft cyclic pitch amplitude to the port and starboard rotors (without affecting the central rear rotor) and so producing yawing moments, as previously explained, is effected by rocking the spider 37 on its universal mounting 38 about the rolling axis of the aircraft, for which purpose the bracket 45 carries (on a pivot) a bell-crank 50, whose horizontal arm is connected by a vertical link 51 to an arm 52 of the spider 37, at right angles to arm 46 and directed to port; while the vertical arm of crank 50 is connected by a push-pull rod 53 to a crank 54 fast on the shaft 55 of a rudder-bar 56 provided with the usual pedals 57.

The action of rocking the spider 37 is, of course, transmitted to the cyclic pitch change mechanism of the left forward rotor LFR and the right forward rotor RFR by means of the link elements 42 and 43 (Fig. 2) and their respectively cooperating link elements 42$l$, 43$r$ (Fig. 3).

The effect of the rudder-bar operation (as above described), for a turning or yawing action to the left, is illustrated by the vector diagram of Fig. 6; and the same diagram also illustrates the superimposing thereon of the further effect secured by a simultaneous left lateral tilt of the pilot's control stick 1 (which, through the linkages shown in Fig. 2, causes a left tilt of the mean pitch control spider 18). Since neither the transverse stick action nor the rudder-bar action affects the position of either the rear mean pitch spider arm 16 or of the rear cyclic pitch spider arm 41, there is no alternation of either the magnitude or direction of the thrust vector VA of the aft rotor RR— and it will be seen that said vector in Fig. 6 appears the same as in Fig. 3 (except for the difference in scale between these two figures). However, the effect of the rudder-bar action upon the thrust vectors of the left and right forward rotors—through link elements 42, 43 (Fig. 2) and their respective cooperating elements 42$l$, 43$r$ (Fig. 3)—is to incline the left one backwardly as shown at VL$b$ (Fig. 6) and to incline the right one forwardly, as shown at VRF. The backwardly inclined vector of the left rotor has at the same time been reduced in magnitude and the forwardly inclined vector of the right rotor has been increased in magnitude (as is designated by the lower-case suffix $b$ and the capital suffix F) in Fig. 6; but this effect is not secured from the action of the rudder bar but from the lateral inclination of the stick 1—which may or may not accompany the use of the rudder, depending upon whether the pilot desires a rolling effect, or the like, along with the turn secured by the rudder bar. The change in vector magnitude is of course secured through the linkage of Fig. 2, including link elements 29 and 30, and the respective cooperating link elements 29$l$ and 30$r$ of the mean pitch change mechanism of the left and right forward rotors (Fig. 3).

Returning now to the matter of differences between the vector amplitude changes imposed through spider 18 upon the two forward rotors as compared with those imposed by said spider upon the aft rotor and, similarly the differences between the vector inclination changes imposed through the spider 37—which effects are illustrated diagrammatically, though not necessarily exactly, in a quantitative sense, by Fig. 2—we should point out that an approximately two-to-one difference is automatically or inherently secured (as between the aft rotor and each forward rotor) by virtue of the inherent construction and angularity of the symmetrically-armed spiders 18 and 37 shown in Fig. 2. Thus, taking spider 18 as an example, a given upward or downward motion of control link 14 (actuated by the longitudinal throw of the pilot's control stick 1) produces a similar motion of link 31 (for the aft rotor) and a motion of opposite throw, but only half the amplitude, as to links 29 and 30. Thus the increase in amplitude of vector VAF (Fig. 5) as compared with the normal vector amplitude (shown at VA in Fig. 6) is about twice as great as is the decrease in vector amplitude of each of the vectors VL$f$ and VR$f$ (as compared with the normal or average). The same thing is true with respect to vector inclinations, derived from the spider 37.

It will further be observed (Fig. 2) that the mounting of bell cranks 6 and 11 by means of bracket 12 upon the upright pillar 13 (as heretofore described in detail) inherently results in the avoidance of any appreciable disturbance of any given position of the spider tilting links 14 and 15, by any operation of the collective pitch control lever 20, since, as the said lever 20 causes the column 13 to move up and down so as to raise or lower the mean pitch of all rotors equally, the bracket 12 carries said bell cranks up and down with it, so that there is no introduction of undesired mean pitch differences between the rotors.

Similar independence of the cyclic pitch functions derived from the rudder bar on the one hand and those derived from longitudinal motion of the pilot's control 1 on the other hand, is inherently secured by the mounting of bell cranks 46 and 50 on the arm 45 which is fixed to the column 35 of the cyclic pitch control mechanism.

A similar principle may of course be employed, if necessary, in the cyclic pitch linkage for each rotor—for example in the linkage which actuates link element 44$a$ (Fig. 4), so that the cyclic pitch changes imposed upon any rotor will not be detrimentally affected by changes in the mean pitch setting thereof through link element 31$a$ (and similarly for the forward rotor).

We claim:

1. In a rotor-equipped aircraft having sustaining-bladed rotors forming rotor systems arranged in tandem as herein defined, the forward rotor system having mean pitch and cyclic pitch control mechanisms, and the rear rotor system also having mean pitch and cyclic pitch control mechanisms, a control system comprising a movably mounted common control member for operating upon said rotor systems, blade pitch control elements coupled to said rotor systems, and control connections between said member and said elements constructed to simultaneously apply therethrough, upon said mechanisms, upon movement of said member, fore-and-aft differential mean pitch control action, collective fore-and-aft cyclic pitch control action, and diffferential fore-and-aft cyclic pitch control action, said connections and control elements being further formed and disposed so that actuation of said control member in a direction for decreasing the mean pitch angle of the forward rotor system and increasing the mean pitch angle of the rear rotor system effects increase of the pitch angles of the retreating blades and decrease of the pitch angles of the advancing blades of the rotors of said systems, the sum of the changes of cyclic pitch amplitude applied to the rear rotor system, upon said actuation of said control member, being of the same algebraic sign as but greater than those simultaneously applied to the forward rotor system.

2. In a rotor-equipped aircraft having sustaining-bladed rotors forming rotor systems arranged in tandem as herein defined, the forward rotor system having mean pitch and cyclic pitch control mechanisms, and the rear rotor system also having mean pitch and cyclic pitch control mechanisms, a control system comprising a movably mounted common control member for operating upon said rotor systems, blade pitch control elements coupled to said rotor systems, and control connections between said member and said elements, including a beam rockable in the pitching plane of the aircraft by said control member and having generally upright linkages connected thereto at points radially spaced from the centre of the beam in azimuths corresponding to azimuths of the several rotor centres with respect to the C. G. of the aircraft, each of the linkages being connected to the mean-pitch control mechanism of the corresponding rotor with such orientation that rocking of the beam in the pitching plane of the aircraft applies fore-and-aft differential mean pitch control to the rotors, together with a member movable by the control member and connected with the cyclic pitch control mechanisms of all the rotors so as to apply collective fore-and-aft cyclic pitch control to the rotors so that actuation of said control member in a direction for decreasing the mean pitch angle of the forward rotor system and increasing the mean pitch angle of the rear rotor system effects increase of the pitch angles of the retreating blades and decrease of the pitch angles of the advancing blades of the rotors of said systems.

3. A construction according to claim 2, wherein said system has a second beam similar to the first and similarly connected to the control member and having generally upright links connected to the cyclic pitch control mechanisms of the several rotors with such orientation that in response to the appropriate movement of said control member said second beam is rocked in the pitching plane of the aircraft in the same sense as the first beam and thereby applies differential fore-and-aft cyclic pitch control to the rotors in the specified sense with reference to the movements of the control member and of the first beam; the second beam being further mounted for bodily displacement axially and so connected to the control member that movement of the control member to rock the beams in the pitching plane of the aircraft also raises or lowers the second beam bodily so as to apply collective cyclic pitch control to the rotors in the specified sense with reference to the movement of the control member and the rocking movements of the beams.

4. A construction according to claim 3, in an aircraft having at least three rotors, of which one pair at least is arranged in laterally side-by-side relation and constitutes one of said rotor systems, in which construction the second-mentioned beam is rockable in the rolling plane of the aircraft by a separate control member, independently of its rocking in the pitching plane and its bodily axial movement, whereby it applies opposite fore-and-aft cyclic pitch control to the cyclic pitch control mechanisms of said side-by-side rotors to effect control in yaw.

5. A construction according to claim 2, in an aircraft having at least three rotors, of which one pair at least is arranged in laterally side-by-side relation and constitutes one of said rotor systems, in which construction the first-mentioned beam is rockable in the rolling plane of the aircraft by the control member for applying transverse differential mean pitch control to said side-by-side rotors to provide control in roll.

6. A construction in accordance with claim 2 wherein said rotor systems comprise having three rotors of which one pair is located side-by-side forward of the center of gravity of the aircraft and in which the third rotor is centrally located to the rear of the center of gravity.

7. A tandem rotor helicopter having bladed rotors rotating in the same sense, a control system comprising mean blade pitch control means operatively connected with the rotors, cyclic blade pitch control means operatively connected with the rotors, and a pilot actuated control column operatively connected with said cyclic control means and having connections effective to introduce cyclic pitch changes of the same sign at the same side of said rotors for a given fore or aft control effect, said cyclic control means being interconnected with said mean pitch control means whereby movement of said control column to introduce cyclic pitch changes to the rotors for forward translation of the helicopter simultaneously decreases the mean blade pitch of a front rotor and increases the mean blade pitch of a rear rotor.

8. A helicopter in accordance with claim 7 having at least three rotors which have substantially equal disk loading and solidity and run at substantially the same speed, one of them having its axis disposed adjacent the vertical, longitudinal midplane of the helicopter, and the other two having their axes spaced apart and located respectively at opposite sides of said plane, said one rotor being longitudinally spaced from said two rotors, and the mean pitch control connections to said two rotors being constructed to actuate them together for forward translation.

9. A helicopter in accordance with claim 8, having a control coupled to the mean pitch control connections of said two rotors and movable to actuate the same to effect inverse mean pitch changes of said two rotors.

10. In a rotor-equipped aircraft having sustaining-bladed rotors forming rotor systems arranged in tandem as herein defined, and having, for each system, means for varying the pitch of the blades thereof for control purposes, a pilot-actuated control member for actuating said means, and mechanism, connected with at least one of said systems, actuated concurrently with said means by movement of said member for control purposes to shift the thrust of said one system in a sense to alter the effective longitudinal dihedral between said systems.

11. The construction of claim 10, wherein the said means is adapted to vary the pitch of the blades of said tandem rotor systems cyclically in a fore-and-aft control sense in response to a fore-and-aft movement of said control member, and wherein said mechanism is coupled to the pitch varying means whereby to secure said alteration of the effective longitudinal dihedral by cyclic pitch variation.

12. In a tandem-rotor helicopter as herein defined, having at least three rotors, two of which are laterally spaced-apart at opposite sides of the longitudinal vertical midplane of the helicopter, and at least one of the rotors being spaced from another in the fore-and-aft sense, a control system comprising first means operatively connected with the rotors for changing the mean blade pitch thereof collectively, second means operatively connected with the rotors for cyclically varying the pitch of blades thereof, a pilot-actuated control member operatively connected with said second means and having connections effective to introduce cyclic pitch changes of like azimuths in the several rotors for fore-and-aft control of the helicopter, said second means being interconnected with said first means whereby movement of said control member to introduce cyclic pitch changes to the rotors for forward translation of the helicopter simultaneously decreases the mean blade pitch of a forwardly disposed rotor and increases the mean blade pitch of a rearwardly disposed rotor.

13. A multiple rotor helicopter control system according to claim 12, having means coupled with said second means for effecting opposite fore-and-aft cyclic pitch control of said two laterally-spaced-apart rotors.

14. A multiple rotor helicopter control system according to claim 12, having means coupled with said first means for effecting opposite mean pitch changes of said two laterally-spaced-apart rotors.

15. The construction of claim 10 wherein the said means includes mechanism for varying the mean pitch of the blades of said tandem rotor systems differentially in the fore-and-aft sense and said second mentioned mechanism is connected to said first mentioned mechanism whereby said second mentioned mechanism is simultaneously actuated with said alteration of the effective longitudinal dihedral.

References Cited in the file of this patent

UNITED STATES PATENTS

| Number | Name | Date |
| --- | --- | --- |
| 1,350,982 | Beurrier | Aug. 24, 1920 |
| 1,783,011 | Florine | Mar. 4, 1930 |
| 2,555,577 | Daland | June 5, 1951 |

FOREIGN PATENTS

| Number | Country | Date |
| --- | --- | --- |
| 155,974 | Switzerland | Oct. 1, 1932 |